United States Patent [19]

Aylward

[11] 4,263,112
[45] Apr. 21, 1981

[54] CELL AND METHOD FOR ELECTROLYSIS OF WATER AND ANODE THEREFOR

[76] Inventors: Robert A. Frosch, Administrator of the National Aeronautics and Space Administration, with respect to an invention of John R. Aylward, Vernon, Conn.

[21] Appl. No.: 161,255

[22] Filed: Jun. 20, 1980

[51] Int. Cl.³ .......................... C25B 1/08; C25B 1/10; C25B 9/00; C25B 11/08
[52] U.S. Cl. ................................ 204/129; 204/290 R; 204/290 F; 204/291; 204/252; 204/266
[58] Field of Search ............... 204/129, 290 R, 290 F, 204/291, 252, 258, 266

[56] References Cited

U.S. PATENT DOCUMENTS

| | | | |
|---|---|---|---|
| 3,853,739 | 12/1974 | Kolb et al. | 204/290 F |
| 3,878,083 | 4/1975 | De Nora et al. | 204/290 F |
| 3,922,226 | 11/1975 | Entwisle | 204/290 F |
| 3,926,751 | 12/1975 | De Nora et al. | 204/290 F |
| 3,993,653 | 11/1976 | Blum et al. | 204/290 F |

Primary Examiner—R. L. Andrews

Attorney, Agent, or Firm—Carl O. McClenny; John R. Manning; Marvin F. Matthews

[57] ABSTRACT

An electrolytic cell for the conversion of water vapor to oxygen and hydrogen included an anode comprising a foraminous conductive metal base member having a coating thereon of 65–85 weight percent iridium oxide and 15–35 weight percent of a high temperature resin binder. Also included are a matrix member and a cathode, with the matrix member containing an electrolyte and the cathode being substantially inert to the electrolyte. The foraminous metal member is most desirably expanded tantalum mesh, and the cell desirably includes reservoir elements of porous sintered metal in contact with the anode to receive and discharge electrolyte to the matrix member as required. Upon entry of a water vapor-containing airstream into contact with the outer surface of the anode and thence into contact with iridium oxide coating, the water vapor is electrolytically converted to hydrogen ions and oxygen with the hydrogen ions migrating through the matrix to the cathode and the oxygen gas produced at the anode to enrich the air stream passing by the anode.

20 Claims, 8 Drawing Figures

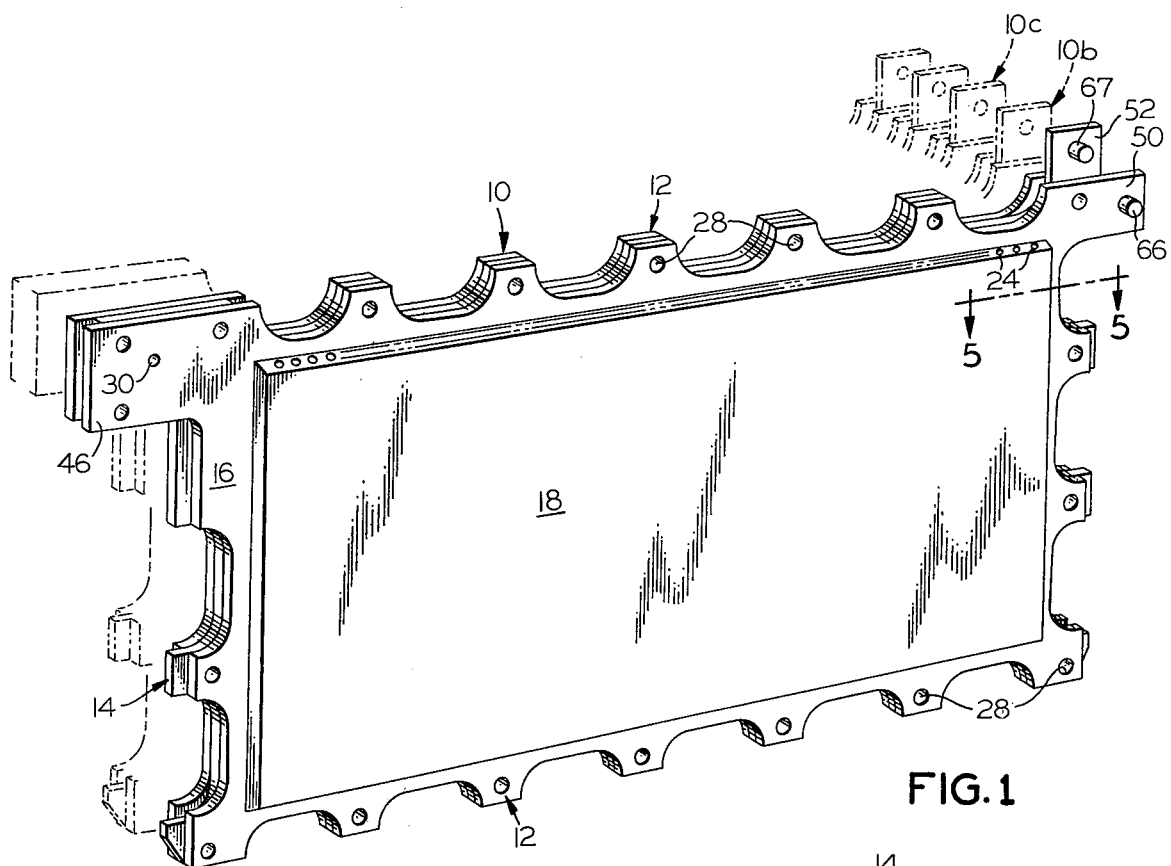
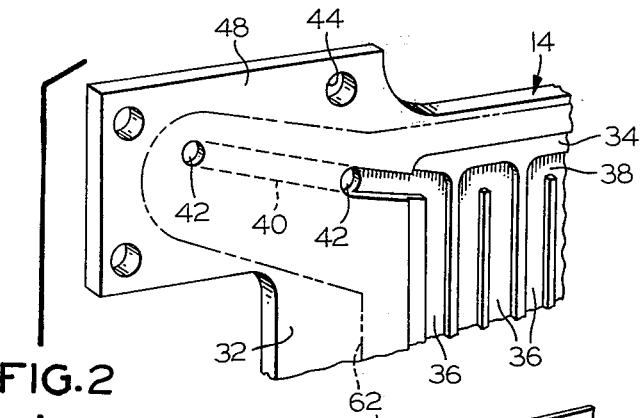
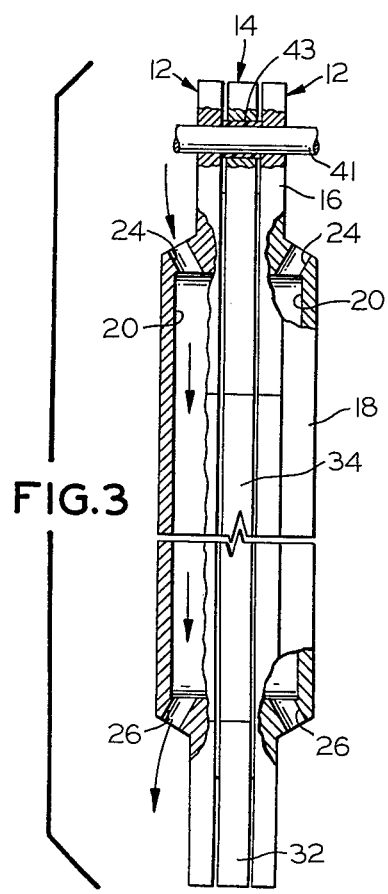
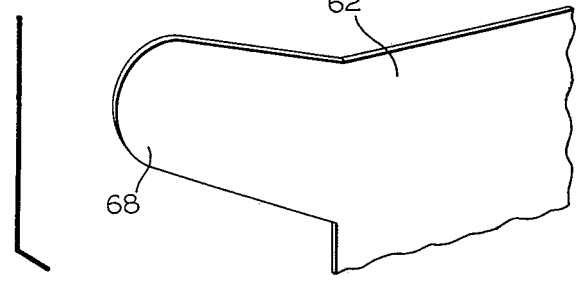
FIG.1
FIG.2
FIG.3

CELL AND METHOD FOR ELECTROLYSIS OF WATER AND ANODE THEREFOR

BACKGROUND OF THE INVENTION

Various devices have been proposed for recovering oxygen from the moisture and waste gases in a closed environment, particularly in connection with space travel vehicle. In some instances, organic means have been employed, and, in other instances, catalytic or electro-catalytic devices have been employed. Generally, the catalytic type of devices have been considered most feasible for extended use and economy of operation since by-product gases may also be employed for other purposes.

The general structure and operation of an oxygen generator utilizing water vapor electrolysis has been described in a paper presented at the Environmental Control and Life Support Systems Conference, San Francisco, California, on Aug. 14–16, 1972 and entitled "Integrated Water Vapor Electrolysis Oxygen Generator and Hydrogen Depolarized Carbon Dioxide Concentrator Development" by J. C. Huddleston and F. H. Greenwood. The paper was printed by the American Society of Mechanical Engineers in 1972 under No. 72-ENAv-7. The devices described therein have proven advantageous but problems have remained with respect to efficiency of the anode and with respect to providing a means for storing electrolyte to compensate for variations in the humidity of the air stream passing through the cell.

It is an object of the present invention to provide such a converter having a highly efficient anode to effect electrolysis of the moisture vapor in the air stream to hydrogen and oxygen.

It is also an object to provide such a converter containing novel and highly effective electrolyte reservoir elements to transfer to and receive from the matrix member the electrolyte required for cell operation in response to variations in the humidity of the air stream.

Another object is to provide a method for electrolytic conversion of the moisture vapor to hydrogen and oxygen utilizing such improved anodes.

SUMMARY OF THE INVENTION

It has now been found that the foregoing and related objects and advantages may be attained in an electrolytic converter for electrolytically converting water and moisture vapor to hydrogen and oxygen. The converter includes a housing providing a cell chamber, an inlet for water vapor, an outlet for oxygen and an outlet for hydrogen. In the chamber is disposed at least one cell assembly including an anode, a cathode and a matrix member between the anode and cathode providing a conductive path therebetween and containing an electrolyte. Both the anode and cathode are pervious to gases, and the anode comprises a foraminous conductive base member having a catalytic coating bonded to at least the face thereof adjacent the matrix member. The catalytic coating comprises 65–85 percent by weight iridium oxide and 15–35 percent by weight of high temperature resin as a binder. Both the conductive base member of the anode and the cathode are substantially inert to the electrolyte of the matrix member. Conductor means are operatively connected to the anode and the cathode to apply a potential thereacross.

The housing provides a passage for water vapor from the inlet and adjacent the surface of the anode for contact with the iridium oxide catalyst coating to effect electrolysis of the water vapor to hydrogen ions and oxygen. The oxygen gas formed at the anode is discharged through the oxygen outlet and the hydrogen ions pass through the matrix member to the cathode to form hydrogen gas which is discharged through the hydrogen outlet of the housing.

In the preferred structure, the conductive base member of the anode is fabricated from a metal selected from the group consisting of tantalum, gold and titanium and the coating thereon is produced by sintering an intimate mixture of iridium oxide and resin upon the base member. The base member is preferably about 0.003–0.010 inch in thickness and the mesh provides 500–2,000 pores per square inch. The foraminous structure of the base member may be provided by an expanded mesh and the resin desirably comprises polytetrafluoroethylene. The coating desirably provides 10–30 milligrams iridium oxide per square centimeter of the underlying portion of the surface of the base member.

In one embodiment of the cell assembly, there are included reservoir members comprising porous sintered titanium elements in contact with the surface of the anode spaced from the matrix member, and these titanium elements contain electrolyte for transfer to the matrix member through the anode.

Most desirably, the electrolyte is selected from the group consisting of sulfuric acid, phosphoric acid and mixtures thereof, and the matrix member comprises a porous inorganic material wetable by the electrolyte and having a thickness of about 0.005–0.030 inch.

In the method of electrolytically converting the water vapor in air to hydrogen and oxygen, the anode is formed by sintering on the foraminous metal base member the mixture of iridium ion and resin binder to form a coating which is bonded to at least one face and at least a portion of the surfaces of the pores of the base member. The anode is then assembled with a cathode and an intermediate matrix member containing electrolyte and a potential is applied across the anode and cathode. A stream of air containing water vapor is passed in contact with the outer surface of the anode with the water vapor therein contacting the coating of the anode and being electrolytically converted to hydrogen ions and oxygen gas. The hydrogen ions pass through the matrix member to the cathode where hydrogen gas is formed, and the oxygen gas formed at the anode passes outwardly therefrom in the air stream to enrich the oxygen content of the air.

In the operation of the cell, the applied potential is desirably within the range of 1.5–1.85 volts. The cell is desirably maintained at ambient temperatures for operation although it will operate effectively at elevated temperatures wherein the stream passing through the cell contains increased amounts of moisture vapor such as might be provided by steam. At cell shutdown, the cell is desirably purged of hydrogen by passing nitrogen or another inert gas therethrough so as to avoid deleterious effects upon the components of the assembly.

BRIEF DESCRIPTION OF THE DRAWINGS

FIG. 1 is a perspective view of a single cell assembly embodying the present invention with additional cell subassemblies being fragmentarily illustrated in phantom line;

FIG. 2 is a fragmentary perspective view to an enlarged scale of the upper left hand corner of the center housing element of a cell subassembly of FIG. 1 and separated therefrom a fragmentary portion of one of the matrix members utilized thereon;

FIG. 3 is a fragmentary cross sectional view in elevation of a cell subassembly of FIG. 1 drawn to an enlarged scale and showing the flow of air therethrough;

DETAILED DESCRIPTION OF THE ILLUSTRATED EMBODIMENT

Turning now in detail to FIG. 1, therein illustrated in solid line is a first cell housing assembly generally designated by the numeral 10 and a series of additional cell housing assemblies 10b, 10c, et seq. fragmentarily illustrated in phantom line. As will be readily appreciated, a converter may include such number of cell housing assemblies 10 as is necessary to provide the required converting activity with respect to a predetermined volume of water vapor or air containing such water vapor.

Figure 4:
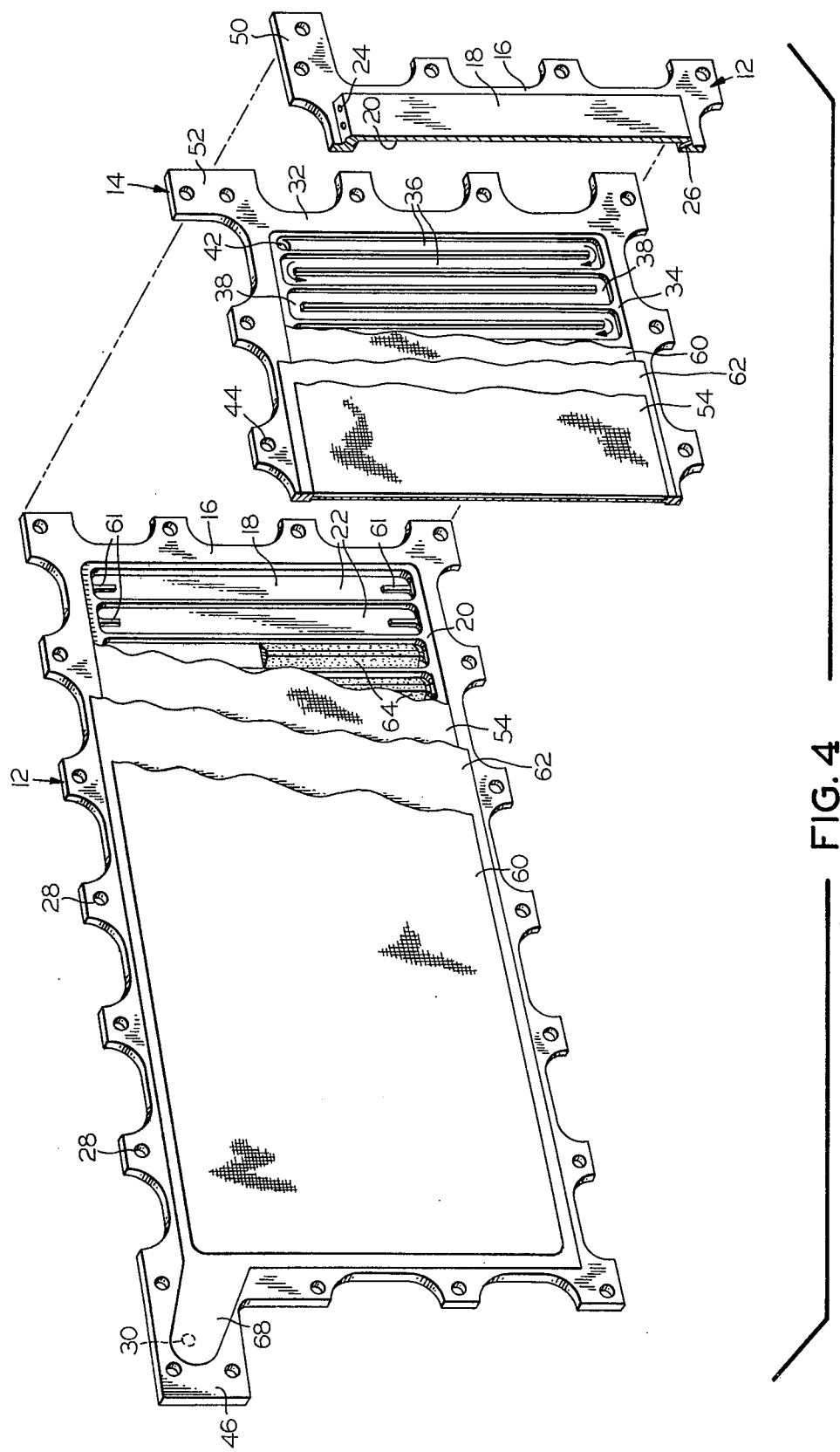
FIG. 4 is a fragmentary, partially exploded view of a cell subassembly of FIG. 1 with portions of the anode, cathode and matrix members broken away at different points to reveal internal construction.
Figure 5:
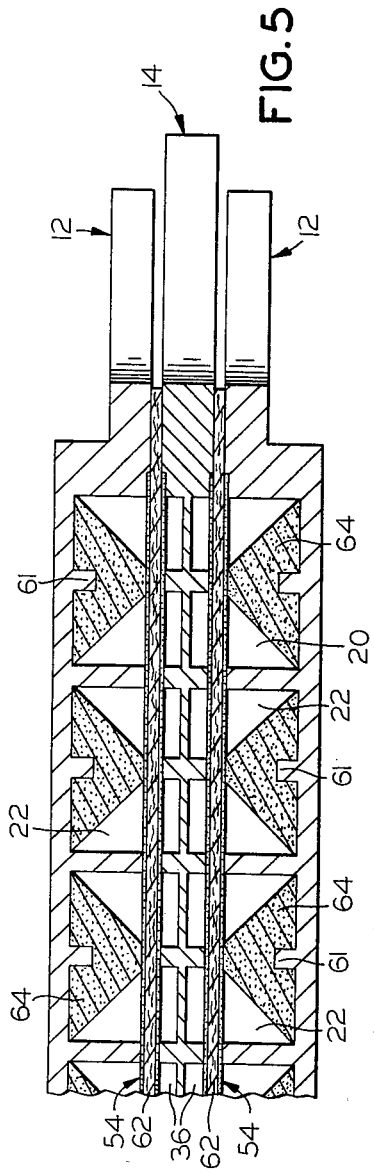
FIG. 5 is a fragmentary sectional view to an enlarged scale along the line 5—5 of FIG. 1.

Each housing assembly 10 is comprised of a pair of shell members generally designated by the numeral 12 and an intermediate member generally designated by the numeral 14. The shell members 12 are substantially identical in configuration and include a peripheral portion 16, a central body portion 18 providing an internal cavity 20 which is divided into a multiplicity of parallel channels 22, all as best seen in FIGS. 3-5. At one end of the channels 22, the wall of the body portion 18 is provided with a series of inlet apertures 24 and at the other end of the channels 22 there are provided similar outlet apertures 26. Spaced about the peripheral portion 16 are a multiplicity of mounting apertures 28 and a hydrogen discharge aperture 30 is provided in a projecting portion 46 at one corner thereof. A projecting portion 50 at the opposite corner thereof provides an aperture receiving a conductor stud 66 to provide means for effecting electrical contact with a source of power.

The intermediate member 14 has a substantially planar peripheral portion 32 and a body portion 34 which has elongated channels 36 in both faces thereof. These channels 36 extend generally parallel to the channels 22 of the shell members 12 and their ends are interconnected by cross channels 38. As seen in FIG. 2, the leftmost channel 36 has discharge channel 40 extending therefrom into the projecting portion 48 and through apertures 42 are provided therein, the outermost of which is aligned with the hydrogen discharge aperture 30 of the shell member 12. At the opposite corner thereof, the intermediate member 14 is provided with a projecting portion 52 having a cathode connector stud 67 seated therein to receive a conductor (not shown) to complete the electrical circuit.

As seen in FIGS. 3-5 and 8, each cell housing assembly 10 in fact provides a pair of cells, one being disposed on each side of the intermediate member 14. Each cell comprises an anode generally designated by the numeral 54 which is comprised of a foraminous conductive metal screen 56 having a catalytic coating 58 thereon, a cathode generally designated by the numeral 60 and a matrix element 62 therebetween containing electrolyte to provide a conductive path between the anode 54 and cathode 60.

As best seen in FIG. 5, seated on the shallow and shortened ribs 61 in some of the channels 22 of the shell members 12 are reservoir elements 64 of porous sintered metal which contain excess electrolyte. The reservoir elements 64 are of truncated triangular cross section with their apices being disposed in contact with the anodes 54. Depending upon the moisture content of the air passing through the channels 22, electrolyte will be transferred to and from the matrix member 62 through the anodes 54 to maintain the desired electrolyte level therewithin.

As seen in FIGS. 2-5, the matrix member 62 is of greater length and width dimensions than the body portions 18,34 of the shell and intermediate members 12,14, so that it extends between the peripheral portions 16,32 and beyond the margins of the anode 54 and cathode 60. When the several elements of the housing assembly 10 are clamped together tightly, the matrix member 62 is compressed between the peripheral portions 16,32 to effect a seal about the operative portion of the cells. The matrix member 62 also serves to insulate the conductive shell and intermediate members 12,14 from each other except to the extent that current passes through the electrolyte-containing portion thereof between the anode and cathode 54,60.

As seen in FIG. 2, the matrix member 62 also has a finger portion 68 projecting from the body thereof between the projecting portions 46,48 of the shell and intermediate members 12,14 and over the hydrogen discharge channels 40. This serves to effect sealing thereabout and to facilitate the flow of hydrogen along the channel 40 to the discharge aperture 30. The fastener elements 41 seated in the mounting apertures 28,44 to secure the cell housing assemblies 10 in assembly and the insulating sleeves 43 which are disposed in the intermediate members 14 about the fasteners so as to provide insulation therefor. The fasteners 41, however, provide the means for conducting current between the shell members 12 and thus to the anodes 54, while the conductor stud 67 provides the electrical connection to the several intermediate elements 14 and thereby to the cathodes 60.

Figure 6:
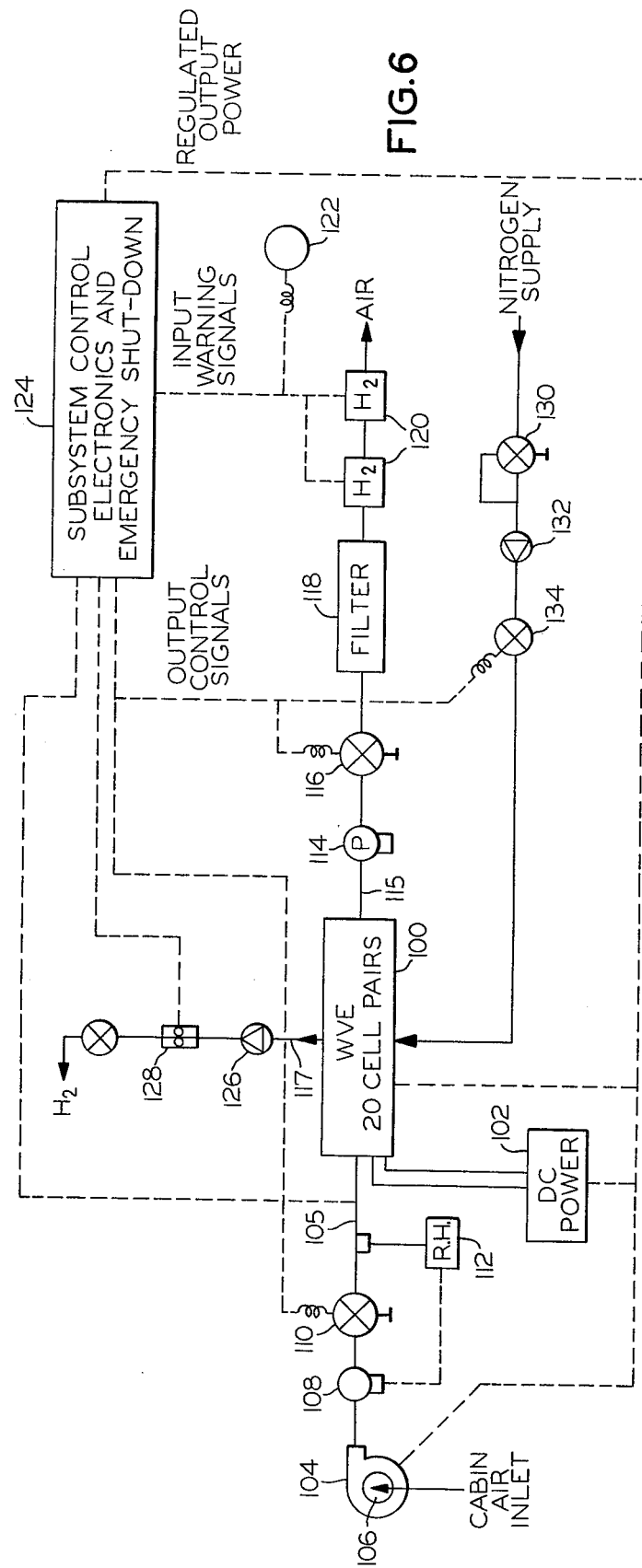
FIG. 6 is a diagrammatic view of the operating components of an electrolytic cell assembly for the conversion of water vapor to oxygen and hydrogen.

Turning now to FIG. 6, therein diagrammatically illustrated in a converter embodying the present invention. In this embodiment, twenty cell housing assemblies 10 of the type illustrated in FIGS. 1-5 are assembled to provide the basic cell subassembly 100 and a source of DC power 102 is connected thereto. Air from the environment is drawn into the fan 104 through the inlet 106 and conducted into the cell 100 for contact with the anodes thereof. Initially, the air exiting from the fan 104 passes through the conduit 105 over a pressure transducer 108 and through a cutoff valve 110, and its relative humidity is determined by the sensor 112.

The oxygen enriched air stream exits from the cell 100 through the conduit 115 and then passes by the pressure transducer 114 through the shutoff valve 116, through the filter 118 and through the hydrogen gas sensors 120, before being discharged to the atmosphere. The partial pressure of oxygen in the air being issued from the converter is determined by the transducer 122.

The hydrogen produced by the cell assembly 100 exits through the conduit 117, passes through the check valve 126 and through the flow meter 128 before being conducted to appropriate instrumentation for the use thereof. The control electronics system is generally designated by the numeral 124 and receives signals from the various elements within the apparatus and will effect shutdown in the event that malfunctioning is determined. Upon shutdown automatically or manually, the cell assembly 100 is purged of hydrogen by nitrogen introduced thereinto through the valve 130, check valve 132 and solenoid valve 134.

Figure 7:
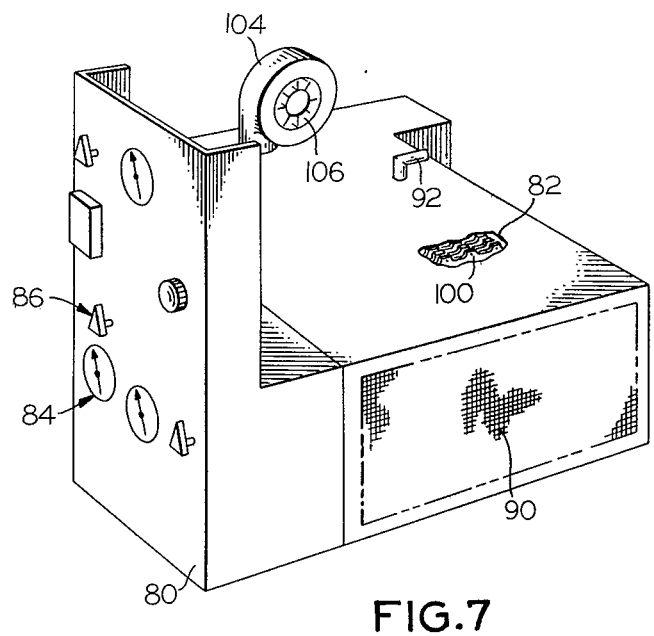
FIG. 7 is a perspective view of a converter assembly constructed substantially in accordance with the diagrammatic representation of FIG. 6 with portions thereof broken away to reveal internal construction.
Figure 8:
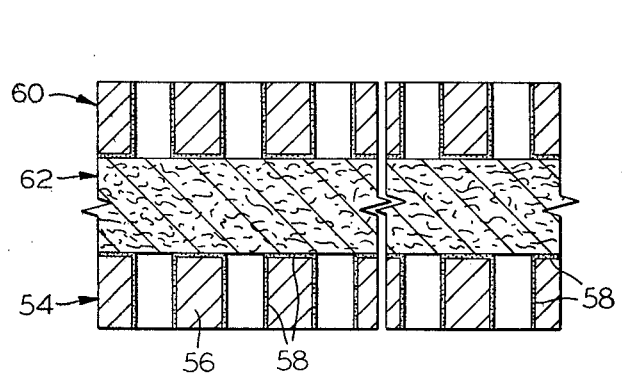
FIG. 8 is a greatly enlarged cross section of an anode, cathode and matrix member subassembly.

Turning now to FIG. 7, a substantially self-contained converter apparatus is illustrated as being comprised of the housing 80, having a cell receptacle 82 in which are disposed a multiplicity of cell housing assemblies. The instrumentation providing the readouts for the various transducers and meters is shown generally by the numeral 84 and the manually operable cutoff valves are shown generally by the numeral 86. Mounted on the housing is the fan 104 having its inlet 106 and air from the fan 104 is conducted through a conduit (not shown) into the cell receptacle 82 wherein it passes through the cell housing assemblies. The moisture in the air is electrolytically converted into hydrogen and oxygen with the oxygen-enriched air stream discharged through the vent 90 and with the hydrogen being discharged through the hydrogen conduit 92. Not shown in this diagrammatic illustration of the assembly are the DC power source and the nitrogen source, as well as various of the fittings and components.

The substrate for the anode may comprise tantalum, gold or titanium, but tantalum is preferred because of the combination of low cost, inertness and resistance to hydrogen embrittlement. The substrate may vary from as little as 0.003 to as much as 0.015 inch in thickness, and the foraminous structure may provide as little as 500 to as many as 1,500 pores per square inch, and even more. Although screens may be employed, expanded mesh structures have been found particularly advantageous.

For the metal of the cathode, gold, platinum, palladium and tantalum are preferred because of their inertness and their resistance to hydrogen embrittlement. Since hydrogen is being evolved in the cathode, titanium may be employed only if it is provided with a protective electroplated deposit of gold or the like. The cathode is conveniently of the same range of thickness as the anode and desirably exhibits the same degree of porosity by use of a similar expanded metal or screen structure. To provide the desired catalytic effect, a catalytic coating of platinum black with a resin binder is used.

The matrix member is most conveniently fabricated from a compounded asbestos material such as blue asbestos since this material will resist degradation by the electrolytes which are preferred and will also be wetted by such electrolytes. Other mineral fibers may also be employed, although they may require pretreatment to provide the desired wetability. The pore volume of the matrix member should be within the range of about 40-80 percent; and its thickness may vary from 0.005 to 0.030 inch, and is preferably about 0.010 to 0.015 inch. The electrolytes used in the matrix most desirably comprise sulfuric acid, phosphoric acid and mixtures thereof.

Although various porous materials may be utilized for the reservoir elements, sintered porous metal structures have proven particularly advantageous, particularly those made of titanium, tantalum and other metals which are substantially inert to the cell electrolyte. A particularly preferred material is a porous titanium product made by Gould, Inc. of St. Paul, Minnesota.

The cell housing elements may be fabricated from various metals including tantalum and titanium. If titanium is utilized, the intermediate element should be plated with gold, rhodium or platinum to prevent hydrogen embrittlement.

The anode coating may contain 15-35 percent by weight polytetrafluoroethylene resin with the preferred content being about 20-25 percent. Although other high temperature resins may be used as the binder, polytetrafluoroethylene is preferred because of its combination of properties. The coating may be applied by any convenient technique but should be sufficiently thick to provide 10-30 milligrams of iridium oxide per square centimeter of the underlying surface of the screen or base member when the screen has a standard mesh size of 20 by 35. Lesser loading may be used with a smaller mesh size and greater loading may be used with a larger mesh size.

The cell will operate with an applied potential as low as 1.4 volts to as much as 1.85 Pl volts depending upon the water vapor content of the air passing through the cell. Preferably, at least about 1.5 volts are applied. The cell is operable at ambient temperatures with air containing water vapor or at higher temperatures with steam. It may also be operated at superatmospheric pressures.

EXAMPLE OF ANODE CONSTRUCTION AND CELL OPERATION

A preferred method for making the anodes of the present invention involves the following procedure.

A soluble iridium compound such as chloroiridic acid or iridium chloride is dissolved in the minimum amount of water required for dissolution. Sodium nitrate in an amount equal to 11 times the weight of the iridium compound is wetted with the iridium solution previously prepared. This admixture is dried at 110° C. and fused at 400° C. for four hours which results in oxidation of the iridium to iridium oxide. After cooling, the fused cake is leached with water (270 ml. $H_2O$ per gram of iridium) to dissolve the soluble salts in the cake. The iridium oxide is then filtered from the leaching solution and washed with water to remove the remaining salts contained therein.

Following drying, the iridium oxide is intimately admixed in water with polytetrafluoroethylene in a weight ratio of 15-30 percent polytetrafluoroethylene (duPont TEFLON 30) to 70-85 percent iridium oxide and the dispersion is then filtered on Whatman No. 50 filter paper. The filter paper containing the water-moist intimate admixture of iridium oxide and resin has placed thereon an expanded tantalum mesh of about 0.005 inch thickness with the mesh size being 20 by 35 (standard). The tantalum mesh is a commercial product made by Exmet Corporation of Bridgeport, Connecticut. The tantalum mesh is then pressed by manual pressure into the coating material upon the filter paper to transfer the coating material to the surface thereof. The coated mesh is then sintered at 310° C. for five minutes to produce a highly adherent uniform coating upon one surface or the mesh and in the pores thereof with a loading of about 20 mg. per square centimeter (dry basis).

A cell is prepared using the anode thus produced and a cathode comprising a similar tantalum mesh structure, with a platinum black catalyst coating of about 20 mg. per square centimeter. A matrix member comprising blue asbestos fiber mat of 0.010 inch thickness and having pore volume of about 65 percent is saturated with sulfuric acid (55%).

Reservoir elements are fabricated from a sintered porous titanium material. The cell housing members are fabricated from titanium and plated with gold on the surfaces defining the cells.

In operation of apparatus substantially as illustrated in the accompanying drawing utilizing the above described cell, current efficiencies greater than 99 percent are obtained in ambient temperatures using atmospheric air and a constant current density of about 60 amperes per square foot. This cell voltage will range from 1.5–1.85 depending upon the water vapor content of the air stream (90–20% relative humidity) and the air velocity through the cell. As variations in atmospheric humidity occur, the electrolyte passes through the anode pores into and from the reservoir elements to provide and maintain the desired electrolyte level in the matrix member.

From the foregoing detailed description and attached drawings, it is readily apparent that the electrolytic converter of the present invention provides a highly efficient assembly for electrolytically converting moisture vapor into hydrogen and oxygen. The anode may be readily and conveniently fabricated, and the internal reservoir members provide an effective means for maintaining the desired level of electrolyte in the matrix despite fluctuations in relative humidity of the air passing through the cell.

Having thus described the invention I claim:

1. In a method for the electrolysis of water vapor in air, the steps comprising:
   A. forming an anode by sintering on the surface of a foraminous metal base member a mixture of 65–85 weight percent iridium oxide and 15–35 weight percent of a high temperature resin binder to form a coating bonded to at least one face and at least a portion of the surfaces of the pores of said base member;
   B. assembling an electrolytic cell comprising said anode, a cathode and an intermediate matrix member containing electrolyte and providing a conductive path therethrough;
   C. applying a potential across said anode and cathode; and
   D. passing into contact with the outer surface of said anode a stream of air containing water vapor, said water vapor contacting said coating of said anode and being electrolytically converted to hydrogen ions and oxygen, said hydrogen ions passing through said matrix member to said cathode where hydrogen gas is formed therefrom, said oxygen gas produced at said anode and passing outwardly therefrom in the air passing through said cell to enrich the oxygen content of said air.

2. The method of claim 1 wherein said electrolyte is selected from the group consisting of sulfuric acid, phosphoric acid, and mixtures thereof.

3. The method of claim 1 wherein said cell is maintained at an ambient temperature of about 50–100° F. during operation thereof.

4. The method of claim 1 wherein said potential is 1.5–1.85 volts.

5. In an electrolytic converter for electrolytically converting water to hydrogen and oxygen, the combination comprising:
   A. a housing providing a cell chamber, an inlet for water vapor, an outlet for oxygen, and an outlet for hydrogen;
   B. at least one cell assembly in said chamber including:
      (1) an anode;
      (2) a cathode;
      (3) a matrix member between said anode and cathode providing a conductive path therebetween and containing an electrolyte;
   said anode and cathode being pervious to gases, said anode comprising a foraminous conductive base member having a coating bonded to at least the face thereof adjacent said matrix member, said coating comprising 65–85 weight percent iridium oxide and 15–35 weight percent of a high temperature resin as a binder, said conductive base member and said cathode being substantially inert to said electrolyte of said matrix member; and
   C. conductor means operatively connected to said anode and said cathode to apply a potential thereacross, said housing providing a passage for water vapor from said inlet and adjacent said anode for contact with said iridium oxide coating thereon to effect electrolysis thereof to hydrogen ions and oxygen, oxygen gas being discharged through said oxygen outlet and the hydrogen ions passing through said matrix member to said cathode to form hydrogen gas for discharge through said hydrogen outlet.

6. The electrolytic converter of claim 5 wherein said conductive base member of said anode is frabricated from a metal selected from the group consisting of tantalum, gold and titanium, said coating thereon being produced by sintering an intimate mixture of iridium oxide and said resin on said base member.

7. The electrolytic converter of claim 6 wherein said base member is about 0.003–0.010 inch in thickness and wherein said mesh provides 500–2,000 pores per square inch.

8. The electrolytic converter of claim 5 wherein said metal of said base member is tantalum and said foraminous structure is provided by an expanded mesh.

9. The electrolytic converter of claim 5 wherein said resin is polytetrafluoroethylene.

10. The electrolytic converter of claim 5 wherein said anode coating provides 10–30 milligrams of iridium oxide per square centimeter of the underlying portion of the surface of said base member.

11. The electrolytic converter of claim 5 wherein said cell assembly includes reservoir members comprising porous sintered titanium elements in contact with the surface of said anode spaced from said matrix member, said porous titanium elements containing electrolyte for transfer to said matrix member through said anode.

12. The electrolytic converter of claim 5 wherein said electrolyte is selected from the group consisting of sulfuric acid, phosphoric acid and mixtures thereof, and wherein said matrix member comprises a porous inorganic material wettable by said electrolyte and having a thickness of about 0.005–0.030 inch.

13. The electrolytic converter of claim 5 wherein said housing includes first and second shell members, an intermediate member therebetween, means securing said shell and intermediate members in assembly, said intermediate member cooperating with each of said shell members to provide a cell chamber therebetween and said inlets and outlets therefor.

14. The electrolytic converter of claim 5 wherein said shell members are provided with elongated channels in their faces adjacent said intermediate member providing passageways for water vapor and oxygen, said intermediate member having elongated channels in each of its faces providing passages for hydrogen and further having passages interconnecting said elongated passages to conduct hydrogen to said outlet.

15. The electrolytic converter of claim 14 wherein said housing including reservoir members in at least some of said channels of said shell elements, said reservoir members comprising porous sintered titanium elements in contact with the surface of said anode spaced from said matrix member, said porous titanium elements containing electrolyte for transfer to said matrix member through said anode.

16. An anode for the electrolysis of water comprising:
   A. a porous conductive base member of a metal selected from the group consisting of tantalum, gold and titanium; and
   B. a coating bonded to at least one face and at least a portion of the surfaces of the pores of said base member, said coating comprising 65–85 weight percent iridium oxide and 15–35 weight percent of a high temperature resin as a binder, said coating being produced by sintering an intimate mixture of iridium oxide and said resin on said base member.

17. The anode of claim 16 wherein said metal and said base member is tantalum and the porous structure is provided by an expanded mesh.

18. The anode of claim 17 wherein said base member is about 0.003–0.010 inch in thickness and wherein said mesh provides 500–2,000 pores per square inch.

19. The anode of claim 16 wherein said resin is polytetrafluoroethylene.

20. The anode of claim 16 wherein said coating provides 10–30 milligrams of iridium oxide per square centimeter of the underlying surface of said base member.

* * * * *